United States Patent
Boren et al.

(10) Patent No.: US 8,339,285 B2
(45) Date of Patent: Dec. 25, 2012

(54) TACTILE PILOT ALERTING SYSTEM AND METHOD

(75) Inventors: Kelly L. Boren, Marysville, WA (US); Dianne L. McMullin, Bothell, WA (US); Rush F. Green, Jr., Seattle, WA (US); Frank P. Santoni, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 394 days.

(21) Appl. No.: 12/510,138

(22) Filed: Jul. 27, 2009

(65) Prior Publication Data

US 2011/0018740 A1   Jan. 27, 2011

(51) Int. Cl.
*G08B 23/00*   (2006.01)

(52) U.S. Cl. ............ 340/965; 340/407.1; 340/575; 340/945; 340/963; 701/9; 701/14

(58) Field of Classification Search ............ 340/965, 340/439, 575, 576
See application file for complete search history.

(56) References Cited

U.S. PATENT DOCUMENTS

| | | | |
|---|---|---|---|
| 4,203,098 A | 5/1980 | Muncheryan | |
| 4,484,191 A | 11/1984 | Vavra | |
| 5,343,370 A | 8/1994 | Ohashi et al. | |
| 5,900,827 A * | 5/1999 | Graham et al. | 340/963 |
| 6,675,095 B1 * | 1/2004 | Bird et al. | 701/301 |
| 6,744,370 B1 * | 6/2004 | Sleichter et al. | 340/576 |
| 6,900,722 B1 | 5/2005 | Gotauco | |
| 7,551,068 B2 * | 6/2009 | Powell et al. | 340/438 |
| 2003/0193408 A1 * | 10/2003 | Brown et al. | 340/945 |
| 2005/0017861 A1 * | 1/2005 | Hunter | 340/457 |
| 2006/0255920 A1 * | 11/2006 | Maeda et al. | 340/407.1 |
| 2008/0174415 A1 * | 7/2008 | Tanida et al. | 340/438 |
| 2011/0001616 A1 * | 1/2011 | Nathan et al. | 340/438 |

* cited by examiner

*Primary Examiner* — Brent Swarthout
(74) *Attorney, Agent, or Firm* — Novatech IP Law

(57) ABSTRACT

A method of alerting an occupant of a seat assembly of the occurrence of a triggering event comprising the steps of monitoring for the occurrence of the triggering event, vibrating the seat assembly and/or probing the seat assembly.

27 Claims, 13 Drawing Sheets

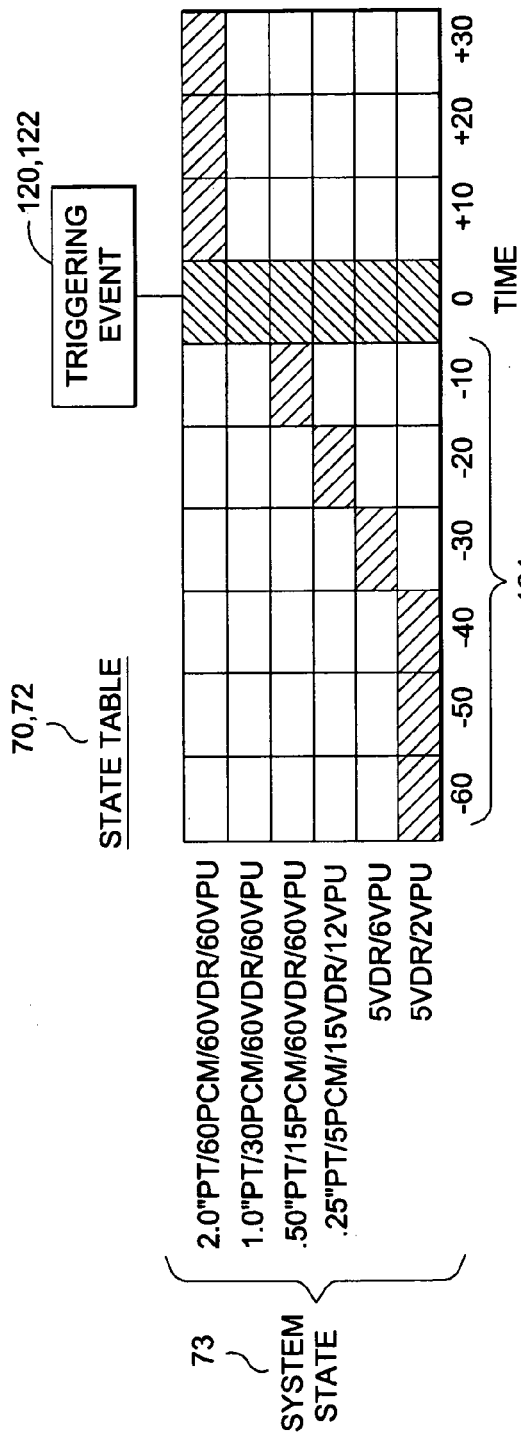

TACTILE PILOT ALERTING SYSTEM AND METHOD

CROSS-REFERENCE TO RELATED APPLICATIONS

Not Applicable

STATEMENT RE: FEDERALLY SPONSORED RESEARCH/DEVELOPMENT

Not Applicable

FIELD

The present disclosure relates generally to warning systems and, more particularly, to an alerting system for alerting an occupant of a seat assembly of the occurrence of an event.

BACKGROUND

Modern aircraft typically include a variety of warning systems for alerting flight crew of potentially unsafe conditions that may arise during flight. For example, a ground proximity or terrain avoidance warning system may provide a warning to the flight crew that the aircraft flight trajectory may place the aircraft into undesirably close proximity to terrain or obstacles. The warning may be emitted as one or more audible or visual signals to the flight crew upon detection of the undesirable condition. The warning may include a visual warning comprising the flashing of a warning lamp on an instrument panel of the flight deck. The warning may progress into an audible "pull up" or "terrain, terrain" command to the flight crew which may be continuously repeated until the flight crew sufficiently alters the flight trajectory of the aircraft.

Other aircraft warning systems may include a stall warning system which may be comprised of sensors, instrumentation and/or an angle-of-attack vane mounted on the aircraft exterior to monitor the angle of attack of the aircraft wings. As the angle of attack approaches the stall angle, the warning system may emit an audible alarm such as a series of beeps and/or a visual alarm comprising the illumination of warning lamps on the instrument panel or at other locations on the flight deck. When stall is imminent, the stall warning system may cause the control column to shake continuously as an indication to the pilot to increase airspeed and/or to push forward on the control column in order to reduce the angle of attack and avoid stalling.

In the above-noted examples, the warning systems are designed to warn the flight crew of conditions that generally require immediate action. However, during the course of a flight, the flight crew may perform a variety of other flight interaction tasks that may not require immediate action but which are necessary to ensure a safe flight. For example, during long-distance flights, the flight crew may be required to make position reports to ground-based air traffic control at specific locations along the flight route. Such position reports may be transmitted using voice radio communications or by way of datalink communications. Similarly, the flight crew may be required to report to air traffic control prior to starting the initial descent from cruising altitude.

Certain physiological factors may have an effect on the ability of the flight crew to remain alert to perform such flight interaction tasks. For example, fatigue may affect the flight crew and may result from the lengthy periods of time during which the flight crew must remain alert during a long-distance flight. On transoceanic flights, the aircraft may cross several time zones which may affect the quality of sleep of the flight crew at their destination location and may result in fatigue in the flight crew during the return flight home. Such fatigue may result in missed flight interaction tasks such as a missed initial descent report to air traffic control.

As can be seen, there exists a potential need for a system and method for alerting a flight crew of the need to perform a task by increasing the level of stimulation that is provided to the flight crew. Further in this regard, there exists a potential need for a system and method for providing stimulation to the flight crew in advance of scheduled flight interaction tasks such that the flight crew may anticipate and prepare for such tasks. Additionally, where permitted by airline operations, there exists a potential need for a system and method that facilitates controlled resting of one of the flight crew during non-critical stages of a long-distance flight.

SUMMARY

The above-noted needs associated with alerting systems are specifically addressed by the present disclosure which includes an alerting system for providing tactile stimulation to an occupant of a seat assembly. The alerting system may comprise a tactile module that may be mountable to a seat assembly and which may include a vibrating unit and/or a probing unit. The vibrating unit may be configured to vibrate the seat assembly. The probing unit may include a probing element for probing the seat assembly. The alerting system may include a controller communicatively coupled to the tactile module and configured to activate the vibrating unit and/or the probing unit in response to the occurrence of a triggering event.

Also disclosed is an alerting system for a seat assembly of an aircraft. The seat assembly may include a seat bottom having an upper portion for supporting an occupant. The alerting system may comprise a tactile module which may include a membrane that may be mountable within an interior of the seat bottom proximate the upper portion. The tactile module may further comprise a vibrating unit mountable to the membrane and which may be configured to cause the upper portion of the seat bottom to vibrate. In addition, the tactile module may include a probing unit having an outwardly extendable probing element which may be configured to reciprocatively probe the upper portion of the seat bottom to cause movement thereof in order to stimulate the occupant.

The alerting system may further include a controller that may be in communication with the tactile module for activating the vibrating unit and/or the probing unit at a predetermined time interval prior to the occurrence of a preplanned event. The controller may be configured to cause a progressive increase in a vibration parameter of the vibrating unit until the occurrence of the preplanned event. The controller may also be configured to cause a progressive increase in a probing parameter of the probing unit until the occurrence of the preplanned event. The alerting system may include a control switch communicatively coupled to the controller. The control switch may be configured for activating and/or deactivating the vibrating unit and/or the probing unit.

Also disclosed is a method of alerting the occupant of a seat assembly regarding the occurrence of a triggering event. The method may comprise the steps of sensing the occurrence of the triggering event and vibrating the seat assembly and/or probing the seat assembly.

Further disclosed is a method of alerting the occupant of the seat assembly of an aircraft in anticipation of a preplanned event. The seat assembly may include a seat bottom having an upper portion which may be configured to be in contact with the occupant. The method may comprise the steps of initiating the vibrating and/or the probing of the upper portion of the seat bottom at a predetermined time interval prior to the occurrence of the preplanned event. The method may further include progressively increasing a vibration event duration of the vibrating of the upper portion and/or increasing a vibration event frequency of the vibrating of the upper portion.

The method may also include progressively increasing a probe travel of a probing element for probing of the upper portion and/or progressively increasing a probing frequency of the probing of the upper portion. The vibrating and/or probing of the seat assembly may be stopped by performing an action including, but not limited to, deploying a control switch, performing a flight interaction task, terminating an autopilot of the aircraft, inputting a flight control command and/or by engaging in external communications with air traffic control and/or other entities.

The present disclosure also includes a method of managing the rest of an occupant of a seat assembly. The method may comprise the steps of programming a predetermined time interval into a controller of an alerting system and using the controller to initiate vibrating and/or probing of the seat assembly at the expiration of the predetermined time interval.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 10 is an illustration of a state table indicating a sequence of vibrating and probing the seat assembly according to corresponding vibrating and probing parameters of respective ones of the vibrating and probing units;

FIG. 11 is an illustration of a legend listing the vibrating and probing parameter acronyms and the associated meanings thereof as used in the state table of FIG. 10;

DETAILED DESCRIPTION

Figure 1:
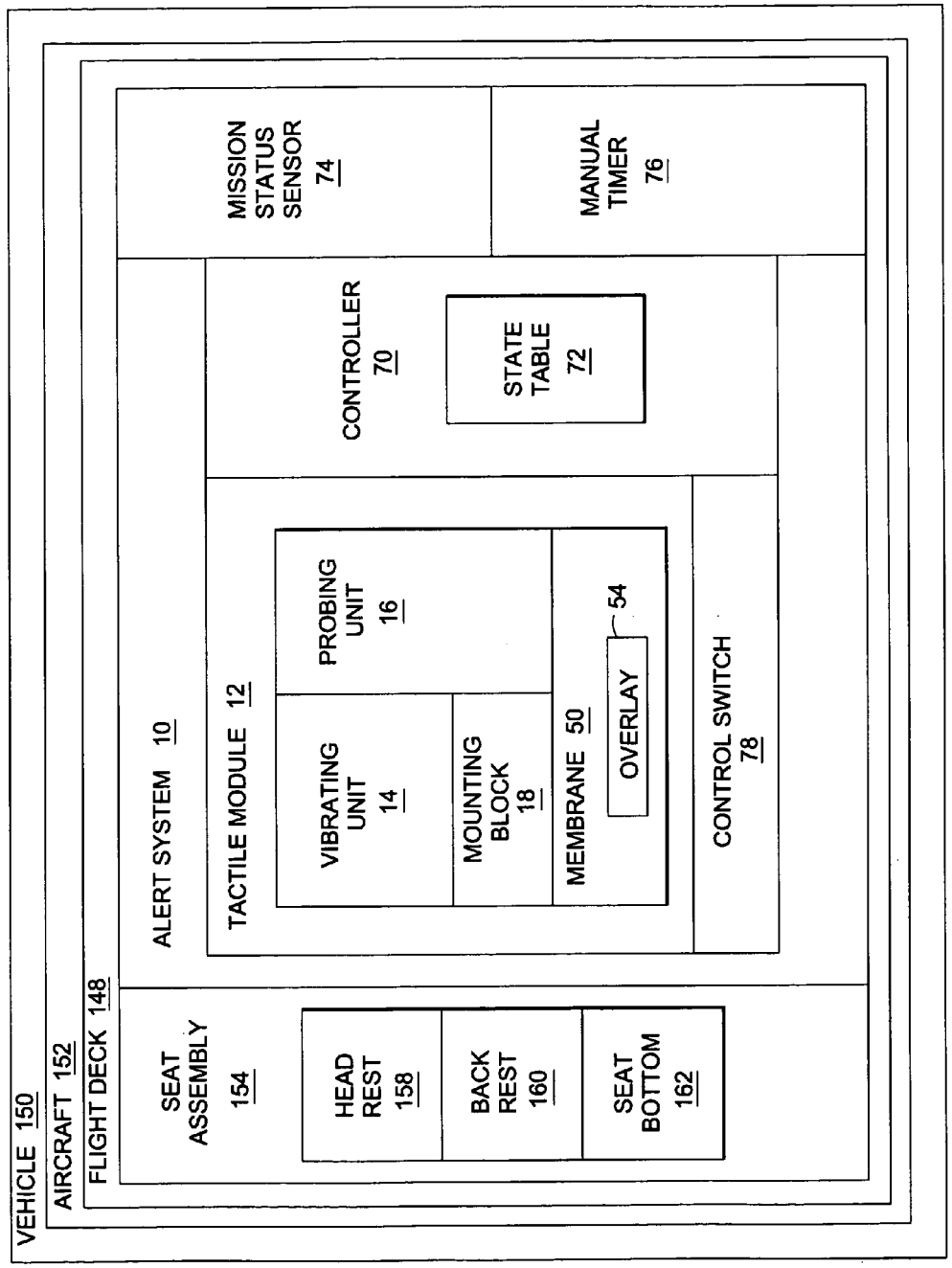
FIG. 1 is an illustration of a block diagram of an alerting system as may be incorporated into a vehicle.
Figure 2:
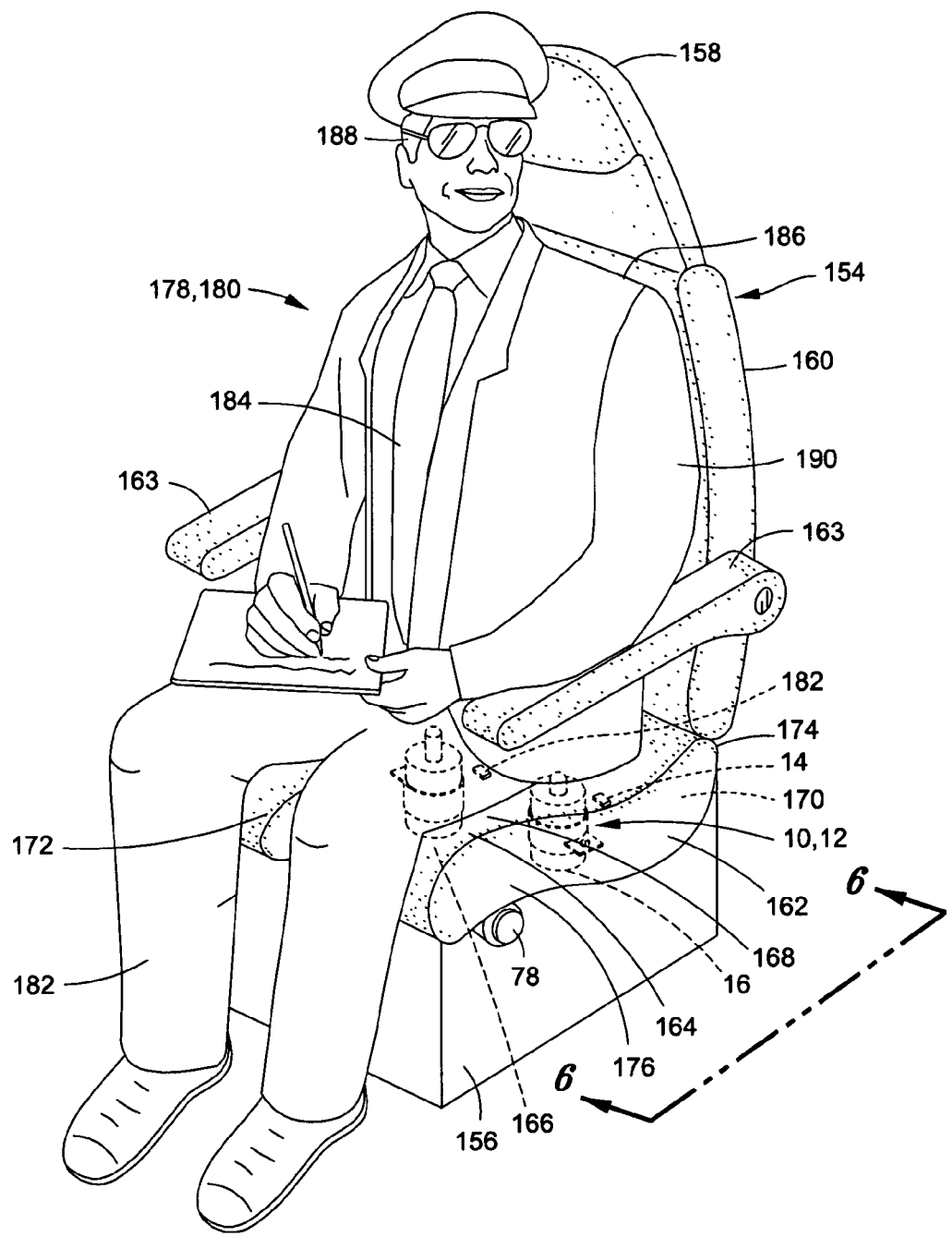
FIG. 2 is a perspective illustration of a seat assembly having an embodiment of a tactile module mounted thereto.

Referring now to the drawings wherein the showings are for purposes of illustrating preferred and various embodiments of the disclosure only and not for purposes of limiting the same, shown in FIGS. 1-8 is an alerting system 10 as may be used for alerting an occupant 180 of a seat assembly 154 regarding the occurrence of a triggering event. As shown in FIG. 1, the alerting system 10 may be mounted within any vehicle 150 including, without limitation, an aircraft 152. For example, the alerting system 10 may be mounted within a flight deck 148 of the vehicle 150. However, the alerting system 10 may be implemented in any application where it is desirable to provide tactile stimulation to an occupant 180 of the seat assembly 154 as illustrated in FIG. 2. As shown in FIG. 1, the seat assembly 154 may comprise a seat bottom 162, a back rest 160 and a head rest 158. However, the seat assembly 154 may comprise any one of a variety of alternative configurations and is not limited to seat assemblies as conventionally known.

Referring still to FIG. 1, the alerting system 10 may include a tactile module 12 having at least one vibrating unit 14 and/or at least one probing unit 16. The vibrating unit 14 and/or the probing unit 16 may be mounted to the seat assembly 154. In an embodiment, the vibrating unit 14 may be supported on a mounting block 18. The mounting block 18 may be mounted on a membrane 50 such that the vibrating unit 14 is supported in non-contacting relation to the membrane 50. In an embodiment, the membrane 50 may optionally include an overlay 54 upon which the mounting block 18 may be mounted. The probing unit 16 may be disposed in close proximity to the membrane 50 or in contacting relation to the membrane 50. However, the probing unit 16 and vibrating unit 14 may be mounted in any arrangement relative to one another.

In an embodiment, the tactile module 12 may include a control switch 78 which may be mounted to the seat assembly 154. The alerting system 10 may include a controller 70 which may be communicatively coupled to the tactile module 12 and/or to the control switch 78 for activating the tactile module 12. The controller 70 may include a state table 72 which may be preprogrammed into the controller 70 as a lookup table by which the controller 70 may regulate the operation of the vibrating unit 14 and probing unit 16. The controller 70 may receive input from a mission status sensor 74 of the vehicle 150 and/or from a manual timer 76 of the vehicle 150 for controlling the tactile module 12.

Referring now to FIG. 2, shown is a perspective illustration of the seat assembly 154 having the alerting system 10 mounted thereto and further illustrating an occupant 180 such as a flight crew 178 member seated in the seat assembly 154.

The seat assembly 154 may be mounted in the aircraft 152 such as on the flight deck 148 as shown in FIG. 1. However, the seat assembly 154 may be mounted in any one of a variety of vehicular and non-vehicular applications and is not limited to a seat assembly 154 installed in an aircraft 152 as shown in FIG. 1. Furthermore, the term "seat assembly" as used herein encompasses any suitable structure, without limitation, for supporting an occupant 180. Further in this regard, the seat assembly 154 may comprise any suitable structure for supporting an occupant 180 in any seated or non-seated orientation or position.

The seat assembly 154 as shown in FIG. 2 may be supported by a seat chassis 156 and may include, without limitation, a seat bottom 162, a back rest 160, arm rests 163 and a head rest 158. The tactile module 12 may be mounted to any portion of the seat assembly 154. For example, as shown in FIG. 2, the tactile module 12 may be mounted within an interior 170 of the seat bottom 162. However, the tactile module 12 may be mounted to any portion of the seat assembly 154 or to combinations of the back rest 160, the head rest 158, the seat chassis 156 or any other component of the seat assembly 154. The tactile module 12 may be mounted to the seat assembly 154 such that tactile stimulation may be provided to an occupant 180 of the seat assembly 154 or to anyone in contact with the seat assembly 154.

Figure 6:
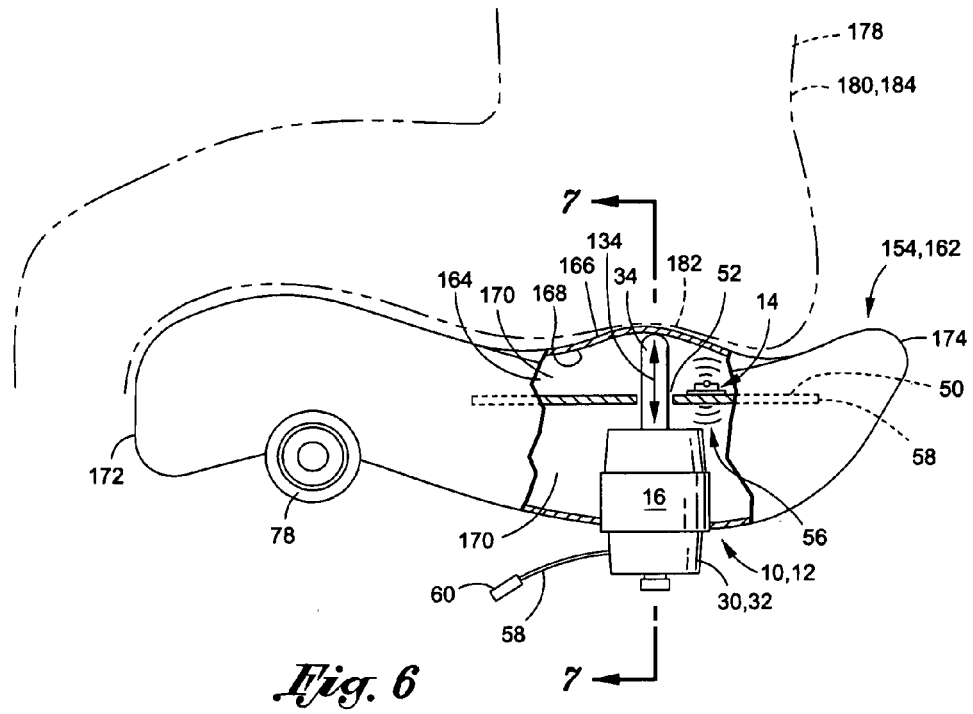
FIG. 6 is a partial sectional illustration of the seat assembly taken along line 6-6 of FIG. 2 and illustrating a probing element of the probing unit for probing an upper portion of the seat bottom.
Figure 7:
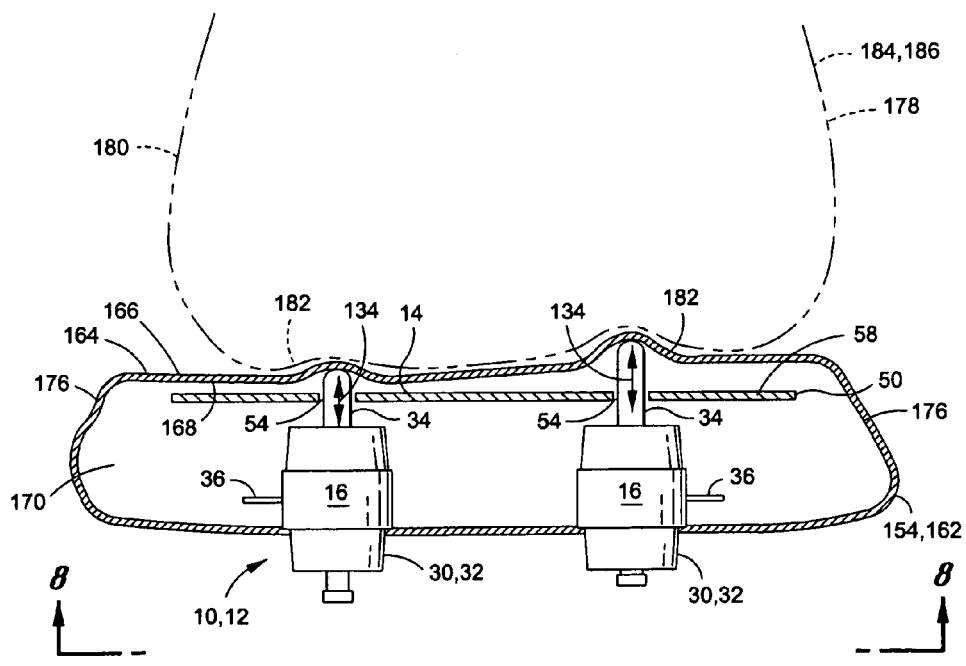
FIG. 7 is a sectional illustration of the seat assembly taken along line 7-7 of FIG. 6 and illustrating a pair of the probing units for probing the upper portion of the seat bottom.

As shown in FIG. 2, the tactile module 12 may include a pair of the probing units 16 mounted within an interior 170 of the seat bottom 162 for stimulating one or both of the legs 182 of the occupant 180. For example, the probing units 16 may be positioned toward a rear 174 of the seat bottom 162 and may be located in such a manner as to reciprocatively probe an upper portion 164 of the seat bottom 162 upon which the occupant 180 may be in contact with such as when seated thereon. More specifically, as shown in FIGS. 6-7, the probing units 16 may be configured to poke or probe against a lower surface 168 of the seat bottom 162 opposite an upper surface 166 of the seat bottom 162 upon which the occupant 180 may be in contact.

Although FIG. 2 illustrates a pair of the probing units 16 mounted in laterally spaced relation to one another for stimulating one or both of the occupant's 180 legs 182, any number of the probing units 16 may be provided and in any location on the seat assembly 154 shown in FIG. 2. The tactile module 12 may include one or more of the vibrating units 14 as shown in FIGS. 3-6 in addition to the probing units 16 or as an alternative to the probing units 16. The vibrating units 14 may be configured to vibrate at least a portion of the seat assembly 154 such that the occupant 180 may be stimulated in a manner described in greater detail below.

Referring still to FIG. 2, the tactile module 12 may be mounted to alternative locations on the seat assembly 154 such as to the back rest 160 to stimulate the occupant's 180 torso 184 or back 186. The tactile module 12 may be mounted to the head rest 158 to stimulate the occupant's 180 neck or head 188. The tactile module 12 may also be mounted to the seat assembly 154 in a manner that facilitates the stimulation of the occupant's arms 190 and/or any other portion of the occupant 180. The alerting system 10 may include the control switch 78 for activating and/or deactivating the tactile module 12. The control switch 78 is shown mounted on the seat assembly 154 such as on a side 176 of the seat bottom 162 toward a front 172 thereof within reach of the occupant 180. The control switch 78 as shown in FIGS. 1-2, 6 and 8-9 may be communicatively coupled to the tactile module 12 to provide the option of manually activating and/or deactivating the probing units 16 shown in FIG. 2 and/or the vibrating units 14 shown in FIGS. 3-6.

Figure 8:
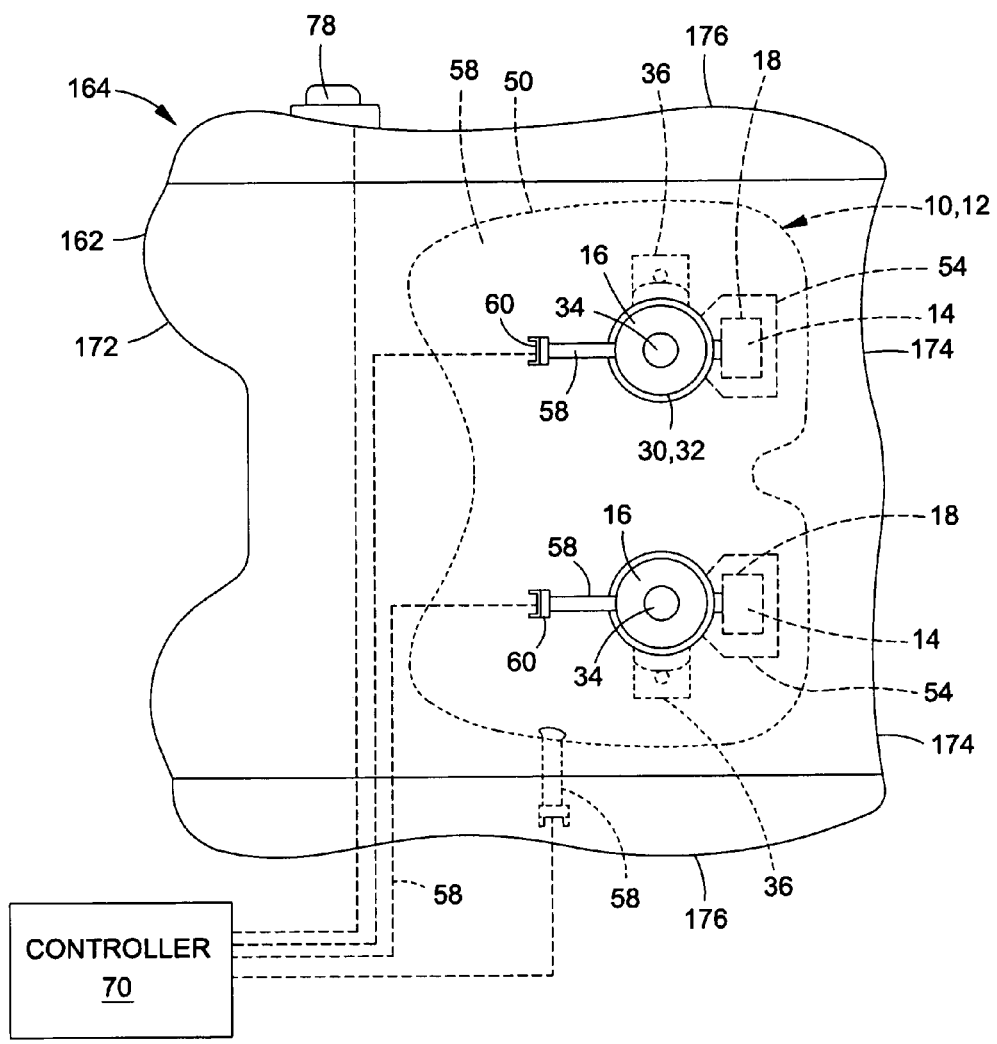
FIG. 8 is a bottom view illustration of the seat assembly taken along line 8-8 of FIG. 7 and illustrating a pair of the probing units and a pair of the vibrating units installed in the seat bottom.
Figure 12:
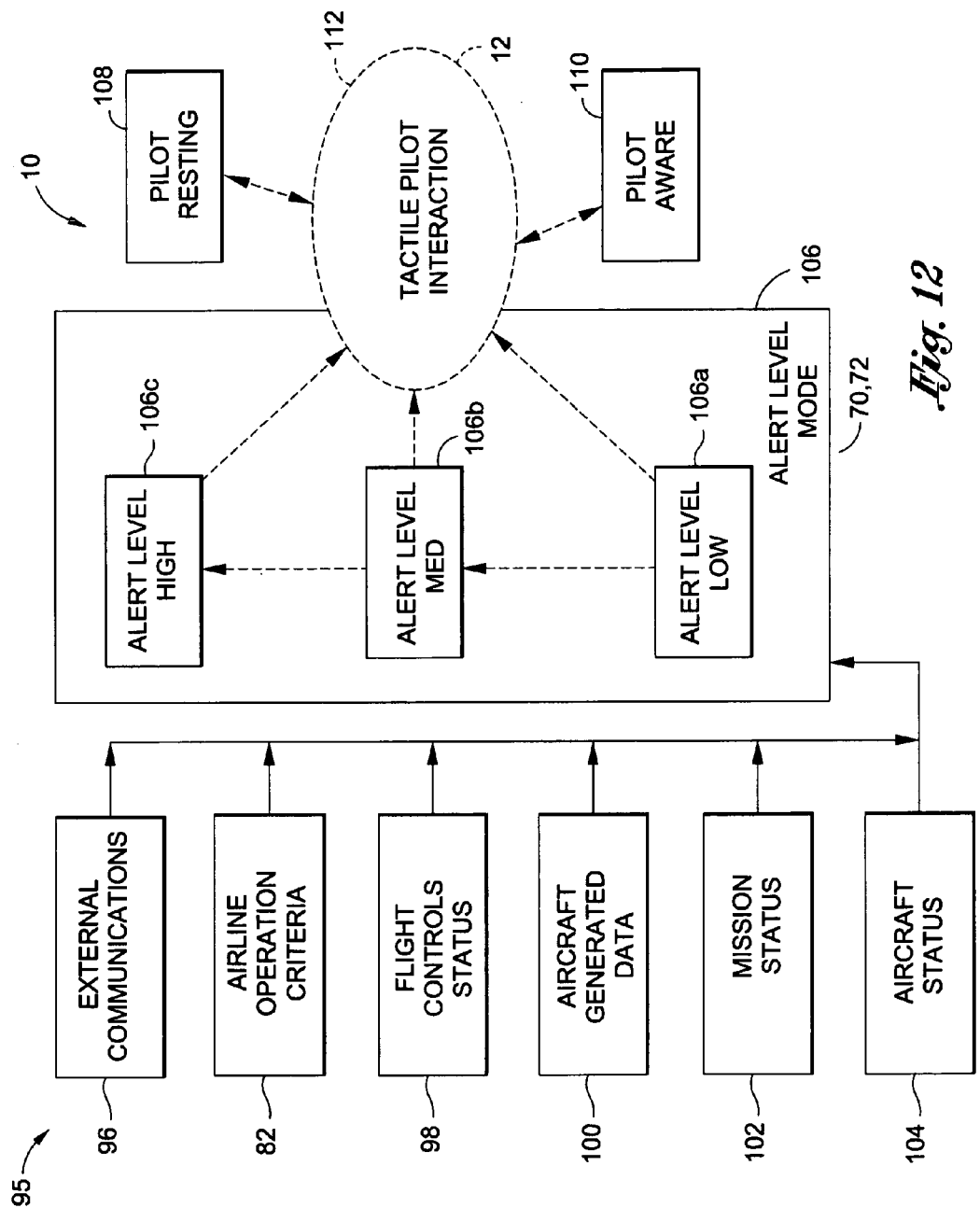
FIG. 12 is an illustration of a block diagram of input variables receivable by the controller for determining an alert level mode that may be implemented by the tactile module.

Referring now to FIGS. 3-8, shown is the tactile module 12 in an embodiment comprising a pair of the vibrating units 14 and a pair of the probing units 16 although any number of vibrating units 14 and any number of probing units 16 may be provided. The vibrating units 14 are configured to vibrate the seat assembly 154 and the probing units 16 are configured to probe the seat assembly 154 as indicated above with reference to FIG. 2. The alerting system 10 may include the controller 70 as illustrated in FIG. 8 which may be communicatively coupled to the tactile module 12 for regulating operation of the vibrating units 14 and/or probing units 16. For example, the controller 70 may be configured to activate one or more of the vibrating units 14 in response to input from one or more input variables 95 as illustrated in FIG. 12 and described in greater detail below. Likewise, the controller 70 may be configured to activate one or more of the probing units 16. The input variables 95 as shown in FIG. 12 may be provided by the systems and components of the vehicle 150.

Referring still to FIGS. 3-8, the tactile module 12 is illustrated as including a membrane 50 for supporting one or more of the vibrating units 14. The membrane 50 may comprise a generally thin sheet of material which may comprise any suitable material such as polymeric material. The membrane 50 may be sized and configured complimentary to the seat assembly 154. For example, as shown in FIG. 8, the flexible membrane 50 may have a shape that approximates the seat bottom 162 of the seat assembly 154 although the membrane 50 may be provided in any size and shape. In addition, the membrane 50 may comprise one or more separate membranes each of which may support one or more of the vibrating units 14. In the embodiment illustrated, the membrane 50 may be mounted within the interior 170 of the seat bottom 162 as shown in FIGS. 2 and 5-7. In addition, the membrane 50 may be embedded within the materials used for construction of the seat bottom 162.

Figure 3:
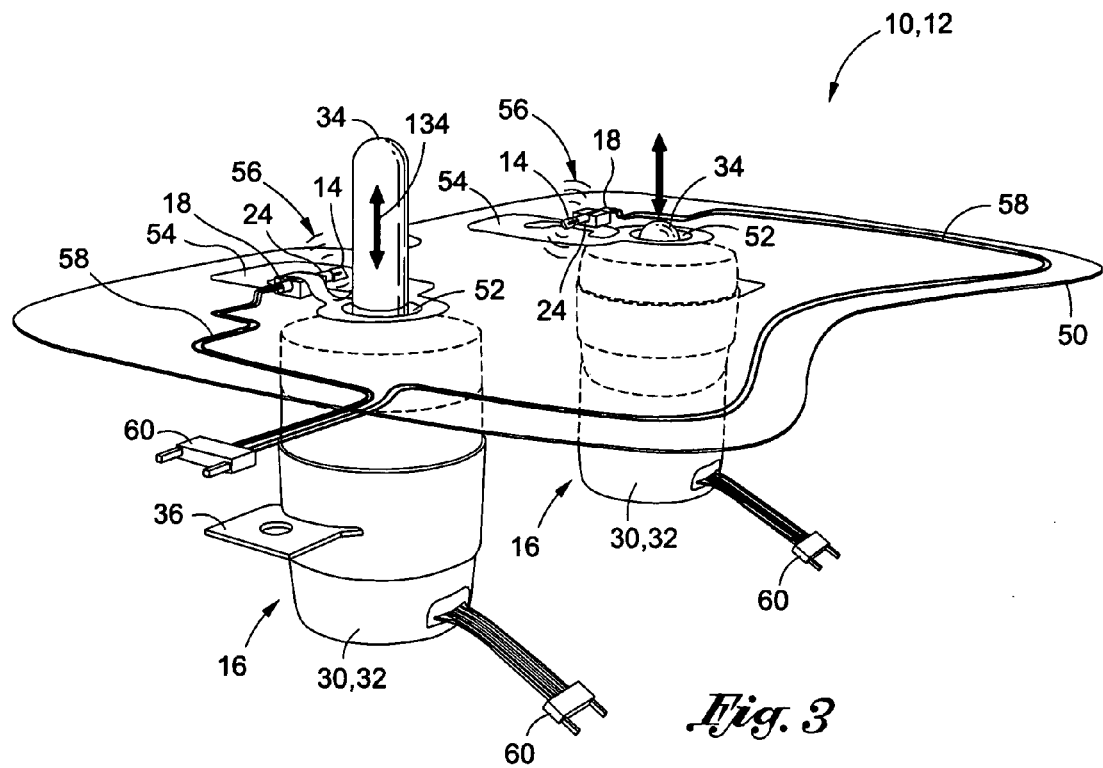
FIG. 3 is a perspective illustration of a tactile module of the alerting system in an embodiment having a pair of probing units and a pair of vibrating units.
Figure 5:
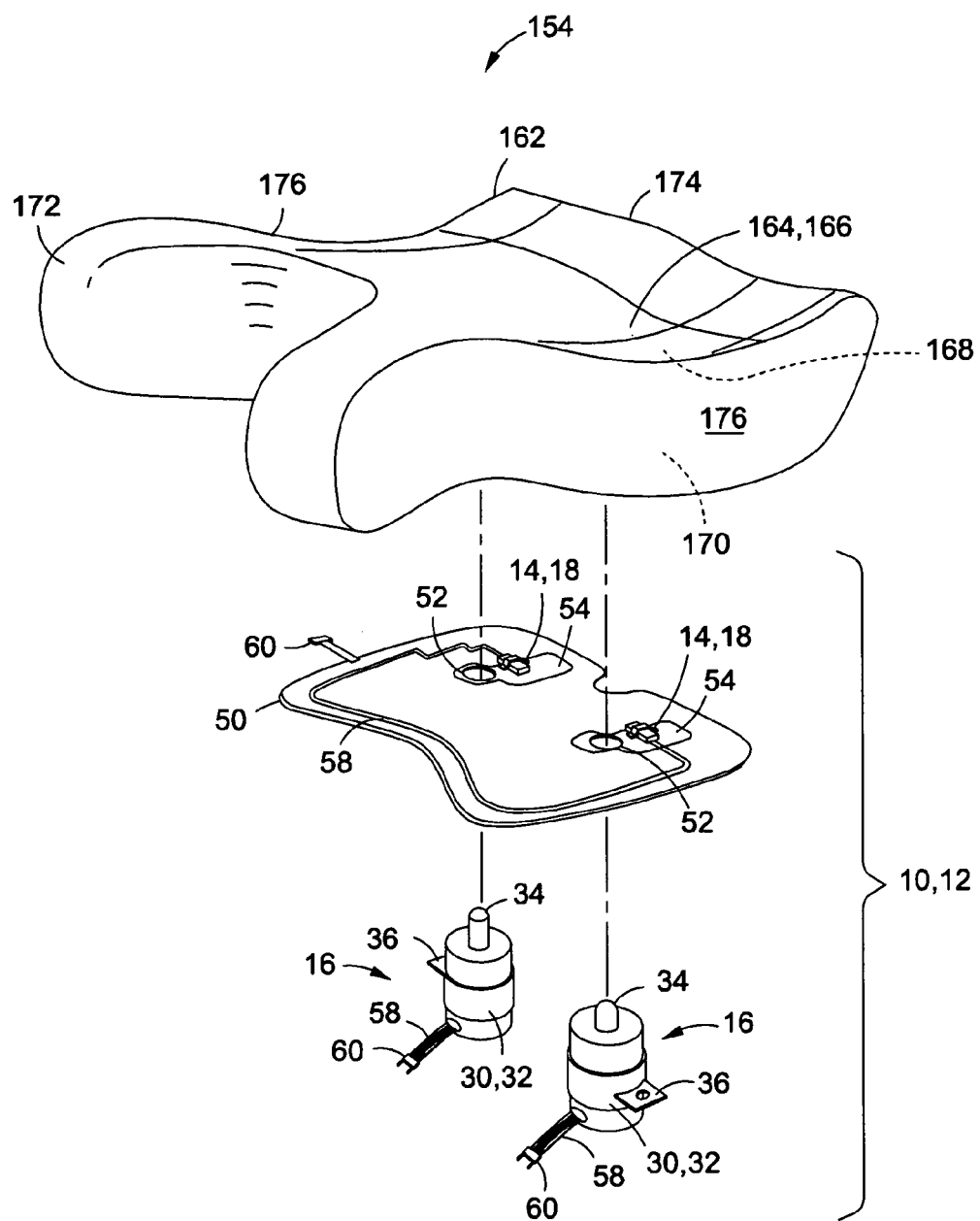
FIG. 5 is an exploded perspective illustration of the tactile module and a seat bottom of the seat assembly.

The membrane 50 may be formed of generally flexible material such that the membrane 50 may bend with the bending and compressing of the seat bottom 162 under the weight of the occupant 180 seated thereon as shown in FIG. 6. In an embodiment, the seat bottom 162 may be formed of polymeric material although any metallic or non-metallic material may be used. The membrane 50 may be mounted within the seat assembly 154 proximate the upper surface 166 as shown in FIGS. 2 and 6-7. The membrane 50 may reduce attenuation of the vibration 56 as shown in FIG. 6 as the vibration 56 travels through the seat bottom 162 material toward the upper portion 164 where the occupant 180 may be seated. As shown in FIGS. 3 and 5, one or more membrane holes 52 may be included in the membrane 50 to accommodate a corresponding number of probing elements 34 of the probing units 16.

Figure 4:
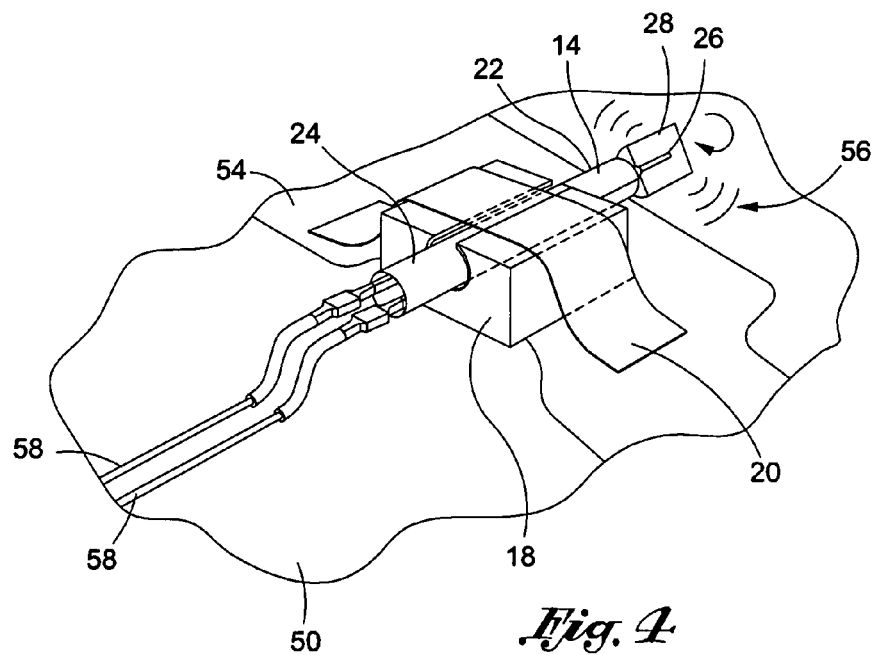
FIG. 4 is a perspective illustration of one of the vibrating units supported on a support block and mounted to a membrane.

Referring to FIGS. 3-8, one or both of the vibrating units 14 which may be supported by the membrane 50 and which is configured to provide a sufficiently robust support for the vibrating units 56 without dampening the vibration 56 produced by the vibrating units 56. One or more of the vibrating units 14 may be mounted on one or more mounting blocks 18 which may be of relatively low density, resilient material such as foam to minimize dampening of vibration 56 produced by the vibrating unit 14. However, the mounting blocks 18 may be formed of any suitable material for supporting the vibrating units 14. In an embodiment, the mounting block 18 may be shaped or contoured to receive the vibrating unit 14. For example, as shown in FIG. 4, the mounting block 18 may include features for receiving the generally cylindrically-shaped configuration of the vibrating unit 14 as shown in FIG. 4. The vibrating unit 14 may be secured to the mounting block 18 in any suitable manner such as by means of a mounting strap 20 which may extend over the mounting block 18 and which may be secured at opposite ends of the mounting strap 20 by mechanical attachment to the membrane 50 or by bonding thereto. However, it should be noted that the present disclosure contemplates any one of a variety of suitable arrangements for fixedly securing the vibrating units 14 in position on the seat assembly 154.

As shown in FIGS. 3-5, the membrane 50 may optionally include an overlay 54 in the area of the mounting block 18. The overlay 54 may be included to provide local structural reinforcement for the area of the membrane 50 upon which the mounting block 18 is mounted. The overlay 54 may also extend around a membrane hole 52 formed in the membrane 50 for structural reinforcement of the membrane hole 52. The membrane hole 52 may accommodate the probing element 34 which may reciprocate through the membrane hole 52 in a manner as illustrated in FIG. 6 and as described in greater detail below.

The mounting block 18 may be formed of any suitably resilient material to minimize dampening of vibration 56 produced by the vibrating unit 14. Such resilient material may include, without limitation, viscoelastic material. For example, the mounting block 18 may be formed of polymeric material such as foam, rubber, fibrous material or any other generally resilient material that may minimize dampening of vibration 56 generated by the vibrating unit 14. In addition, the mounting block 18 may provide a means for mounting the vibrating unit 14 in spaced relation to the membrane 50 such that the vibrating unit 14 is fixed in non-contacting relation to the membrane 50 to prevent dampening of vibration 56 by the relatively large mass of the membrane 50.

Referring to FIG. 4, the vibrating unit 14, in an embodiment, may comprise a vibrating unit motor 22 such as, without limitation, an electrically powered micro-motor that may be housed within a vibrating unit housing 24 having a shaft 26 extending outwardly therefrom. The shaft 26 may include an eccentric weight 28 mounted thereon such that centrifugal force of the eccentric weight 28 during rotation of the shaft 26 causes vibration 56 of the vibrating unit 14. As may be appreciated, the vibrating unit 14 may be implemented in a variety of alternative configurations for generating vibration 56 in order to stimulate an occupant 180 of the seat assembly 154 as shown in FIGS. 2 and 7-8 and is not limited to configurations having a rotating eccentric weight 28. Furthermore, the vibrating unit 14 may be mounted in any manner and is not limited to mounting on the membrane 50 as illustrated in FIGS. 3-6. For example, the membrane 50 may be altogether omitted from the tactile module 12 and one or more of the vibrating units 14 may be mounted directly to the seat assembly 154. In addition, one or more of the vibrating units 14 may be mounted to the seat assembly 154 at any location thereof including at any exterior or interior 170 location of the seat assembly 154.

Referring to FIG. 3, the membrane 50 may include conductive wiring 58 for electrically connecting one or more of the vibrating units 14 to the controller 70 such as for powering the vibrating units 14 and/or for regulating operation of the vibrating units 14. For example, FIG. 3 illustrates the conductive wiring 58 being formed on the membrane 50 or integrated into the membrane 50 and terminating at one or more umbilicals or connectors 60. The connectors 60 may provide a means for releasably connecting the vibrating units 14 to the controller 70. The membrane 50 may also include conductive wiring 58 for electrically connecting the probing units 16 to the controller 70. Alternatively, as shown in FIG. 3, the probing units 16 may be wired to the controller 70 as shown in FIG. 8 using one or more connectors 60. In this regard, the vibrating units 14 may be directly wired to the controller 70 without using the conductive wiring 58 of the membrane 50. The present disclosure also contemplates wireless connection between the controller 70 and the vibrating and probing units 14, 16 for regulating the operation thereof.

Referring to FIGS. 3 and 6-7, the probing units 16 may be configured to probe the occupant 180 of the seat assembly 154 by means of one or more probing elements 34. For example, the probing elements 34 may extend outwardly from a probing unit housing 30 which may contain a probing unit motor 32 or solenoid which may be electrically powered. The probing elements 34 may be linearly actuated such that the probing elements 34 are axially movable relative to the probing unit housing 30 as illustrated in FIGS. 3 and 6-7. The probing elements 34 may have a generally elongate shape with a generally blunt tip for stimulating the occupant 180 using a reciprocative motion. However, the probing elements 34 are not limited to the configuration shown in the FIGS. 3 and 6-7 but may be provided in any size, shape and configuration.

Each one of probing units 16 may be mounted to the seat assembly 154 using any suitable mounting configuration such as by using the mounting brackets 36 extending outwardly from the probing unit housing 30 as illustrated in FIG. 3. The mounting brackets 36 may be mechanically secured to the seat assembly 154 such as to the seat bottom 162 shown in FIGS. 6-7. However, the probing units 16 may be mounted to the seat assembly 154 in any suitable manner. Further in this regard, the probing units 16 are not limited to installation within the seat bottom 162 but may be mounted at any location within an interior 170 of the seat assembly 154 or along an exterior of the seat assembly 154. Furthermore, the tactile module 12 is not limited to a pair of the probing units 16 but may include any number. Even further, the alerting system 10 may include multiple tactile modules 12 mounted at different locations on the seat assembly 154 and is not limited to installation on the seat bottom 162 as illustrated in FIG. 5. In this regard, the tactile modules 12 may be positioned at any location on an interior 170 or exterior of the seat assembly 154 or in several locations on the seat assembly 154.

Referring to FIG. 5, shown is an exploded perspective illustration of an embodiment of the tactile module 12 illustrating the interconnectivity of the probing units 16, vibrating units 14, and membrane 50 in relation to the seat bottom 162 of the seat assembly 154. Although the tactile module 12 is illustrated as comprising a pair of the probing units 16 and a corresponding pair of the vibrating units 14, the tactile module 12 may comprise any one of a variety of different configurations or combinations of the vibrating and probing units 14, 16. For example, the tactile module 12 may include a single one of the probing units 16 or a single one of the vibrating units 14. If the membrane 50 is included with the tactile module 12, the membrane 50 may be provided in any suitable size, shape and quantity for supporting the vibrating units 14. Even further, the tactile module 12 may include multiple membranes 50 disposed in any suitable arrangement within the seat assembly 154. Alternatively, the membrane 50 may be omitted from the tactile module 12.

Referring to FIG. 6, shown is the tactile module 12 installed within the interior 170 of the seat bottom 162. The probing unit 16 is shown mounted toward the rear 174 of the seat bottom 162 such that the probing element 34 may probe the upper portion 164 of the seat bottom 162 at a location that may stimulate the legs 182 of the occupant 180 of the seat assembly 154. Likewise, the vibrating unit 14 is shown as being installed on the membrane 50 at a location that is aft of the probing elements 34. However, the vibrating unit 14 may be installed at any suitable location relative to the probing unit 16. In an embodiment, the vibrating unit 14 may be installed at a location that minimizes the distance from the vibrating unit 14 to the occupant 180 of the seat assembly 154. In this manner, vibrations 56 generated by the vibrating unit 14 must travel a relatively short distance to reach the occupant 180 and thereby minimize the degree to which the vibrations 56 may be attenuated by materials within the seat bottom 162.

As can be seen in FIG. 6, the probing unit 16, in an embodiment, may contact a lower surface 168 of the seat bottom 162 during reciprocative motion of the probing element 34. When the probing unit 16 is operating, the probing element 34 may extend through the membrane hole 52. The probing element 34 may move in a reciprocative motion at varying amounts of probe travel 134 and at varying probing durations in order to produce varying amounts of stimulation to the occupant 180 of the seat assembly 154 as described in greater detail below. Likewise, the vibrating unit 14 may be regulated in a manner to produce varying amounts of vibration 56 and over varying durations for applying varying amounts of stimulation to the occupant 180.

The control switch 78 may optionally be included with the seat assembly 154 and may be electrically coupled to the vibrating unit 14 and/or probing unit 16 to allow for manual activation and/or deactivation thereof. Further in this regard, the control switch 78 as shown in FIGS. 1-2, 6 and 8-9 may be configured to allow for manual alteration of the vibration and probing characteristics of the respective vibrating and probing units 14, 16 as described below. As can be seen in FIGS. 2, 6 and 8, the control switch 78 may be mounted on a front 172 or side 176 of the seat bottom 162 and may be positioned to be within reach of the occupant 180 of the seat assembly 154 although the control switch 78 may be mounted at any location on the seat assembly 154. Further in this regard, the control switch 78 may be mounted at locations other than on the seat assembly 154 such as at any location on the vehicle 150 illustrated in FIG. 1 including any location on the flight deck 148 shown in FIG. 1.

Referring to FIG. 7, shown is an illustration of the seat assembly 154 showing the pair of probing units 16 for probing the upper portion 164 of the seat bottom 162. The probing element 34 may be reciprocated along a length of probe travel 134 as illustrated in FIG. 6. The controller 70 shown in FIGS. 1 and 8 may be configured to regulate the amount of the probe travel 134 of the probing elements 34 as shown in FIGS. 6-7. The probe travel 134 is graphically illustrated in the state table 72 of FIG. 10 and described below. Although two or more of the probing elements 34 as shown in FIG. 7 may be reciprocated in a synchronized manner, the probing elements 34 may be regulated to move out of phase or asynchronously relative to one another in order to provide a variation in stimulation of the occupant 180. Alternatively, each one of the probing elements 34 may be operated in phase with one another such that the probing elements 34 reciprocate in unison but with differing amounts of probe travel 134. As may be appreciated, the probing units 16 and vibrating units 14 may be operated in an infinite variety of movement patterns to provide a variety of stimulation patterns to the occupant 180. Such movement patterns of the probing elements 34 are not limited to probe travel 134 and probing frequency 136 as shown in the state table of FIG. 10 but may further include duration of probing events when the probing elements 34 are reciprocating. The movement patterns may optionally include duration of idle time when the probe elements 34 are at extreme ends of the probe travel 134 as shown in FIG. 7 or at any intermediate point along the probe travel 134. As can be seen, the probing units 16 as shown in FIG. 7 may be operated in one or more of a variety of movement patterns to provide stimulation to the occupant 180.

As shown in FIG. 8, the tactile module 12 may be provided in an embodiment including the pair of probing units 16 shown as being positioned in laterally spaced relation to one another within the interior 170 of the seat bottom 162. The pair of vibrating units 14 may be installed adjacent to the pair of probing units 16. The control switch 78 and tactile module 12 are shown as being electrically coupled to the controller 70 through any suitable connection such as by means of the conductive wiring 58 installed on the membrane 50 as shown in FIG. 3. However, the control switch 78 and/or tactile module 12 may be wirelessly coupled to the controller 70 for regulating operation of the tactile module 12. Power may be provided to the tactile module 12 by hardwire connection such as through the controller 70. Power may alternatively be provided to the tactile module 12 by the vehicle.

Figure 9:
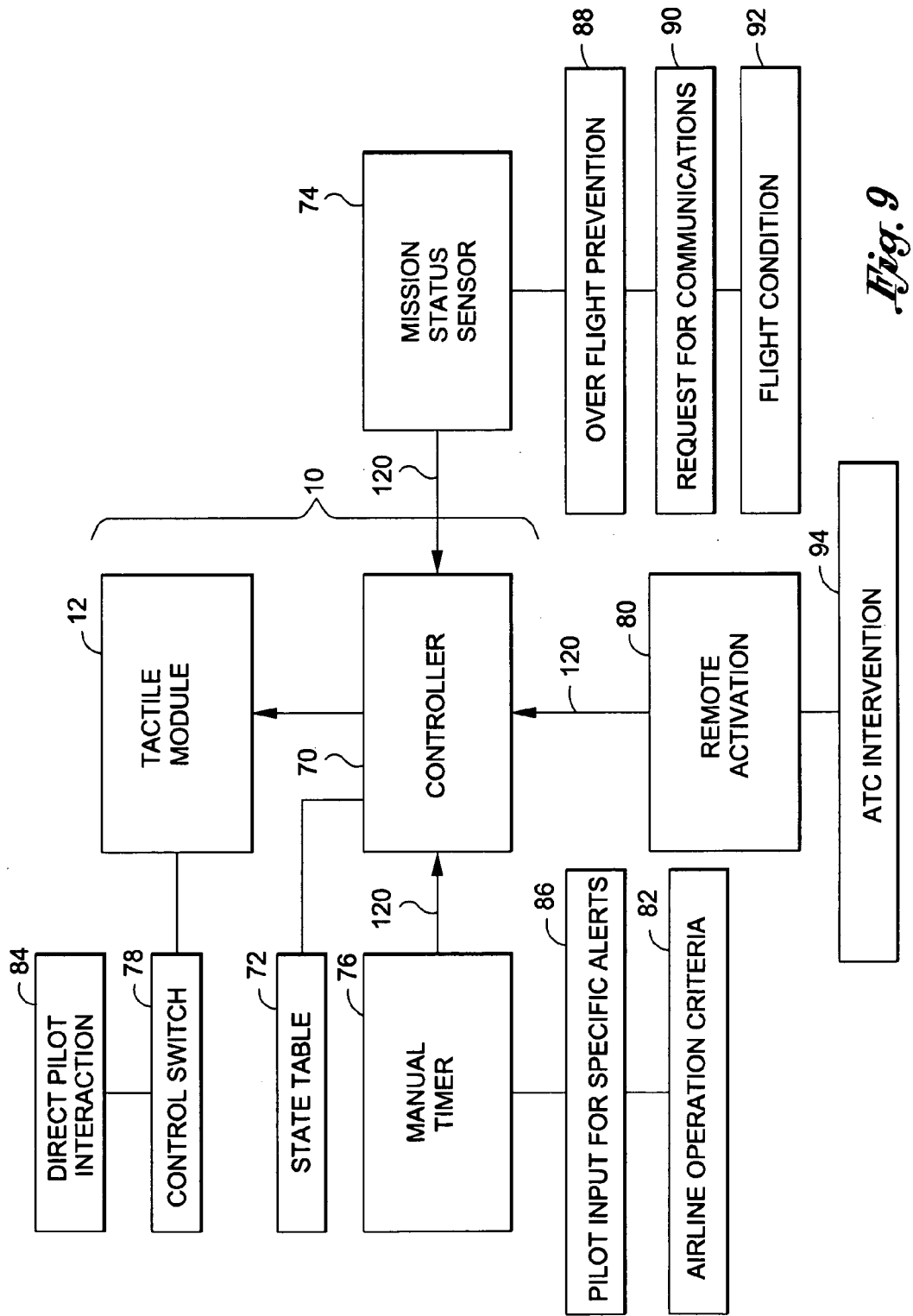
FIG. 9 is an illustration of a block diagram of the alerting system receiving input from a mission status sensor, a remote activation device and a manual timer.

Referring to FIG. 9, the controller 70 is configured to receive input regarding the occurrence of the triggering event 120 as shown in FIG. 9. The triggering event 120 may be defined as an event which causes the controller 70 to activate the tactile module 12 such that at least one of the vibrating units 14 and/or at least one of the probing units 16 may provide tactile stimulation to the occupant 180 of the seat assembly 154 of FIG. 2. For example, input to the controller 70 regarding the occurrence of the triggering event 120 may be provided by the vehicle. The triggering event 120 may be provided to the controller 70 by vehicle systems such as a mission status sensor 74, a remote activation device 80 and/or a manual timer 76. The triggering event 120 may be sensed or provided to the controller 70 by any one of such components but may additionally be provided or sensed by any one of a variety of additional or existing vehicle systems or components.

In an embodiment, the triggering event 120 may comprise a missed flight interaction cue wherein the flight interaction cue requires the performance of an activity. For example, the flight interaction cue may comprise a request for communications 90 as illustrated in FIG. 9 such as from air traffic control wherein a verbal response may be required from the flight crew. Other examples of the triggering event 120 may include a departure or deviation from a flight profile such as an unintended or unplanned change in altitude, attitude, heading, air speed, vertical speed or any other flight parameter. Such deviation from the flight profile may occur as a result of an unintended or uncommanded flight event.

Referring still to FIG. 9, the triggering event 120 may be provided to the controller 70 by the mission status sensor 74. The triggering event 120 may be representative of one or more flight conditions 92 of the aircraft. For example, the flight conditions 92 may include atmospheric conditions through which the aircraft is flying and/or geographic conditions relative to the aircraft or any one of a variety of other conditions. Flight conditions 92 may be weather related and may include, without limitation, predicted turbulence or windshear. The flight conditions 92 may alternatively be the relation of the aircraft to nearby air traffic or nearby terrain or obstacles. The triggering event 120 may be generated as a result of air traffic control (ATC) intervention 94 upon receipt of a remote activation signal from air traffic control and which may be relayed to the controller 70 by a remote activation device 80 as shown in FIG. 9. The remote activation device 80 may comprise an existing component of the vehicle such as an existing portion of a communications system of the vehicle.

As indicated above, the triggering event 120 shown in FIG. 9 may include a missed flight interaction task such as a missed initial descent, a missed verbal report of initial descent, or any number of other flight interaction tasks. However, the triggering event 120 may also comprise a preplanned event 122 such as, without limitation, an upcoming flight interaction task such as an upcoming initial descent. To preemptively avoid such missed flight interaction tasks, the controller 70 may be configured to activate one or more of the vibrating units 14 and/or one or more of the probing units 16 at a predetermined time interval prior to occurrence of the preplanned event. In this manner, the alerting system 10 may provide overflight prevention 88 capability as illustrated in FIG. 9. Other flight interaction tasks for which the tactile module 12 may be activated at a predetermined time interval prior to the occurrence of such preplanned events include, but are not limited to, landing gear deployment, flap deployment, power setting adjustments and a variety of other flight control settings.

The preplanned event 122, shown in the state table 72 of FIG. 10, may further comprise a crew rest period such as may be permitted according to airline operations criteria 82 shown in FIG. 9. Crew rest periods may be of a predetermined duration and may be preprogrammed into the controller 70 or manual timer 76 prior to takeoff or at any time during the flight. Such preplanned events may be modified by flight crew or as a result of pilot input for specific alerts 86 as also shown in FIG. 9 wherein the tactile module 12 may be activated at a specific time at the expiration of a predetermined time interval. For example, the manual timer 76 may provide a means by which a flight crew member (i.e., pilot) may adjust the start and/or end time of a crew rest period. The controller 70 may activate the tactile module 12 at the start of the predetermined time interval and prior to the expiration of the crew rest period by initially activating one or more of the vibrating and/or probing units 14, 16 shown in FIGS. 3-8 such that the occupant 180 of the seat assembly 154 of FIG. 2 may be slowly or gradually awakened. In addition, the alerting system 10 may include the control switch 78 which may provide a means by which the duration of the rest period may be adjusted by direct pilot interaction 84 as illustrated in the block diagram of FIG. 9.

Referring to FIGS. 9-11, the alerting system 10 may include a means for progressively increasing the level of stimulation that may be provided to the occupant 180 of the seat assembly 154 of FIG. 2. In this regard, the controller 70 may be configured to provide an initially low level of stimulation to the occupant 180 by causing the vibrating unit and/or probing unit 16, 16 shown in FIGS. 3-8 to vibrate at a relatively low intensity level and/or to cause the probing of the seat assembly 154 at relatively low intensity levels. The alerting system 10 may be configured to progressively increase the vibration and/or probing intensity until the occurrence of a deactivating event such as manual deployment of the control switch 78 as shown in FIG. 9. As is illustrated in the block diagram of FIG. 9, the operation of the tactile module 12 may be deactivated by direct pilot interaction 84 using the control switch 78 or by a variety of other deactivating events. For example, the deactivating event may comprise termination of automatic operation of the flight controls (i.e., termination of autopilot), by manipulation of flight control settings, by data communications and/or verbal communications with air traffic control and/or with nearby air traffic, or by any other event that may indicate that the flight crew is alert and/or aware.

Referring to FIGS. 10-11, the controller 70 may be preprogrammed with a sequence of vibration parameters 126 and probing parameters 132 of the corresponding vibrating unit 14 and probing unit 16 as shown in FIGS. 3-8. In this regard, the controller 70 may be preprogrammed with a state table 72 as shown in FIG. 10 which, in an embodiment, may facilitate the operation of the tactile module 12 according to a system state 73 representing a predetermined manner of operating the tactile module 12 of FIGS. 1-3 and 5-8. For example, the state table 72 may facilitate a progressive increase in the intensity of stimulation that may be provided to the occupant 180 of the seat assembly 154 shown in FIG. 2. The vibrating unit 14 shown in FIGS. 1-3 and 5-8 may be configured to be operated according to the vibration parameter 126 as shown in FIG. 10 which may include a vibration event duration 128 and a vibration event frequency 130 as illustrated in FIG. 11. The vibration event frequency 130 may be defined as the number of times that the vibrating unit 14 operates within a given time period. The vibration event frequency 130 may be defined in terms of vibration events per time unit (VPU) as shown in FIG. 11. As shown in FIG. 11, the time unit 75 may be defined in terms of minutes, hours, days or any other time unit suitable for the environment within which the alerting system 10 is operated. In an embodiment of the alerting system 10, the vibration event frequency 130 as shown in FIG. 10 may include one (1) vibration event or less per minute. The number of vibration events per time unit (VPU) may occur at greater frequencies to provide more frequent stimulation to the occupant 180 shown in FIG. 6. The vibrating unit may also be operated such that the number of vibration events per time unit (VPU) may occur without interruption such that essentially continuous vibration is provided to the occupant 180 shown in FIG. 6. In a non-limiting example, a vibration event frequency 130 of one (1) event per time unit (i.e., 1 VPU) may correspond to a single period of vibration of, for example, a five (5) second duration (i.e., 5 VDR) occurring within a one (1) minute time frame. Uninterrupted or continuous vibration may be identified as 60 VPU in the state table 72 of FIG. 10 indicating that the vibrating unit vibrates for a duration of sixty (60) seconds (i.e., 60 VDR) within each minute of a sixty (60) minute time unit (i.e., 60 VPU).

Referring still to FIGS. 10-11, in a similar manner, the probing unit 16 may be configured to be operated according to a probing parameter 132 comprising a probe travel 134 and/or a probing frequency 136. As illustrated in FIG. 6, the probe travel 134 is the distance that the probing element 34 extends during reciprocative movement and may be defined in terms of probe travel in inches (PT) in FIG. 11. In an embodiment, the probing unit 16 may be configured such that the probe travel 134 ranges from approximately 0.25 inch or less, identified as 0.25" PT in the state table 72 of FIG. 10, and up to at least 2.00 inches and which is identified as 2.0" PT in the state table 72 of FIG. 10. The probing frequency 136 is the number of times that the probe extends and retracts during each reciprocative cycle and may be defined in terms of cycles per minute (PCM) in FIG. 11. In an embodiment of the alerting system 10, the probing frequency 136 may range from one (1) cycle or less per minute up to at least sixty (60) cycles per minute or 60 PCM as shown in the state table 72 of FIG. 10.

The state table 72 shown in FIG. 10 illustrates an embodiment for progressively increasing an intensity of the vibration and probing of the seat assembly 154 shown in FIG. 2. The state table 72 further illustrates activation of the tactile module 12 at a predetermined time interval 124 prior to the triggering event 120 which may be a preplanned event. In the example of the state table 72 of FIG. 10, the tactile module 12 may be initiated at sixty minutes (−60) prior to the occurrence of the triggering event 120 which may comprise the preplanned event. For example, as described above, the triggering event 120 may be a planned initial descent from cruising altitude upon initial approach to a destination. The controller 70 may cause the vibrating unit 14 of FIGS. 3-8 to vibrate at a vibration event duration 128 of five seconds (5VDR) as shown in FIG. 10 during each of two vibration events occurring during each minute (2VPU) in order to stimulate the occupant shown in FIGS. 6-7 at a low intensity level. As shown in FIG. 10, the pattern may be repeated over the subsequent ten (10) minute time intervals until thirty minutes (−30) prior to the triggering event 120 at which point the vibration event frequency 130 may increase to six vibration events per time unit (6VPU).

By repeating the relatively low intensity vibration parameters 126, the occupant 180 shown in FIGS. 6-7 may be gradually stimulated over a time period as a subtle warning of an upcoming event which may require action. Alternatively, the repeating of the relatively low intensity vibration parameters 126 may provide a means to gradually awaken the occupant 180 from a planned crew rest period. Referring still to FIG. 10, at twenty minutes (−20) prior to the triggering event 120, the probing unit 16 may be activated to increase the intensity of stimulation. The vibration event frequency 130 may also increase to twelve vibration events per time unit (12VPU) with a vibration event duration 128 of fifteen seconds (15VDR). The state table 72 of FIG. 10 may be programmed such that the probing element 34 may be initially reciprocated at a relatively low intensity level. For example, the state table 72 of FIG. 10 illustrates an initial probing frequency 136 of five cycles per minute (5PCM) with a probe travel 134 of 0.25 inch (0.25" PT). At ten minutes (−10) prior to the triggering event 120, the vibration event frequency 130 may increase to continuous vibration represented as 60VPU in the state table 72 and wherein the vibration event duration 128 is also listed as sixty seconds (60VDR) indicating continuous vibration. In addition, the probing element 34 may be reciprocated at an increased probing frequency 136 of fifteen cycles per minute (15PCM) with a probe travel 134 of 0.50 inch (0.50" PT).

Referring still to FIG. 10, at the triggering event 120 occurring at time zero (0), the vibration of the seat assembly 154 shown in FIG. 2 may be continuous and the probing element 34 may be reciprocated at a probing frequency 136 of thirty cycles per minute (30PCM) with a probe travel 134 of 1.0 inch (1.0" PT). At ten minutes (+10) past the triggering event 120, the vibration of the seat assembly 154 may remain continuous and the probing element 34 may be reciprocated at a probing frequency 136 of sixty cycles per minute (60PCM) with a probe travel 134 of 2.0 inch (2.0" PT). However, as may be appreciated, the values listed in the state table 72 are representative of one embodiment of values for the vibration and probing parameters 126, 132 and are not to be construed as limiting alternative values for the vibration and probing parameters 126, 132. Even further, although a progressive increase in vibrating and probing may be desirable, it is also contemplated that the vibrating and probing units 14, 16 may be operated with random values for the vibration and probing parameters 126, 132, or with values of the vibration and probing parameters 126, 132 that produce a gradual decrease in intensity. Furthermore, the state table 72 shown in FIG. 10 may be configured such that the probing unit 16 is operated prior to operation of the vibrating unit 14 or that either one of the vibrating and probing units 14, 16 may be dormant or non-operative in certain types of triggering events 120 but simultaneously operated in other types of triggering events 120. In this regard, the tactile module 12 may be configured to allow for adjustment of a preprogrammed sequence in the vibrating and probing of the seat assembly 154 of FIG. 2 such as by direct pilot interaction 84 using the control switch 78 shown in FIG. 9.

Referring to FIG. 12, shown in the block diagram are input variables 95 that may be received by the controller 70 for determining the alert level mode 106 that may be implemented by the tactile module 12 for stimulating the occupant 180 shown in FIGS. 6-7. As shown in FIG. 12, the input variables 95 may include external communication 96 including, but not limited to, communications from air traffic control. Non-responsiveness to such requests for external communications 96 may result in the implementation of a low alert level 106a with corresponding low intensity stimulation similar to that illustrated in the state table of FIG. 10 at time (−60). Continued non-responsiveness to such requests for external communications 96 may result in an increase in the alert level mode 106 from a low alert level 106a to a medium alert level 106b or from a medium alert level 106b to a high alert level 106c.

Referring still to FIG. 12, the input variables 95 may further include airline operations criteria 82 wherein violation of such criteria may result in activating the tactile module 12 or increasing the alert level mode 106 from a low alert level 106a to a medium alert level 106b or to a high alert level 106c. For example, without limitation, airline operations criteria 82 may prohibit descending below an altitude of 10,000 feet unless automatic flight controls (i.e., autopilot) are terminated. Upon occurrence of the triggering event 120 comprising the descent of the aircraft, the controller 70 may implement one of the low, medium or high alert modes 106a, 106b, 106c in the tactile module 12. As may be appreciated, the above-noted sequences of implementing the tactile module 12 are exemplary only and should not be construed as limiting of alternative sequences. In this regard, the present disclosure contemplates alternative values of the vibration and probing parameters 126, 132 and alternative durations over which such parameters 126, 132 may be implemented in the tactile module 12.

Referring again to FIG. 12, the input variable 95 may also include flight controls status 98 which may comprise input regarding the settings and operability of flight controls of the aircraft 152 of FIG. 1. As is known in the art, such flight controls may include, without limitation, conventional ailerons, elevator and rudder although the present disclosure contemplates other flight controls whose operation may generate an input variable 95 for receipt by the controller 70 for determining the alert level mode 106 to be implemented in the tactile module 12.

The controller 70 may include logic for reconciling and prioritizing input to the controller 70 from the input variables 95 and from other non-tactile warning systems of the vehicle known in the art such as audible and visual warning systems. The input variable 95 may further comprise aircraft generated data 100 as shown in FIG. 12 which may include a time history of flight control settings and other data that may be measurable over the course of a flight. Mission status 102 may include data regarding current geographic positional information of the aircraft and may further include data regarding flight origin and destination. Aircraft status 104 as an input variable 95 in FIG. 12 may include data regarding the status or condition of various systems such as, without limitation, navigation, hydraulic, pneumatic, electrical and/or mechanical systems or any other relevant system.

Still referring to FIG. 12, one or more of the above-mentioned input variables 95 may be received by the controller 70 for assessing the need to activate the tactile module 12 and the alert level mode 106 at which to implement the vibrating unit 14 shown in FIGS. 2-8 and/or probing unit 16 shown in FIGS. 2-8. Such input variables 95 as shown in FIG. 12 may also facilitate a determination by the controller 70 regarding the alertness level of the occupant 180 or flight crew 178 of FIG. 2 and whether the occupant 180 such as a pilot is aware 110 as shown in FIG. 12. The level of awareness and alertness of the flight crew 178 (e.g., pilot) of FIG. 2 may be determined by reviewing a time history of flight control manipulations or by reviewing the responsiveness to external communications 96 or by using other input variables 95 such as those listed in FIG. 12. The controller 70 shown in FIGS. 8-9 may implement tactile pilot interaction 112 by initiating the tactile module 12 into one of the low, medium or high alert level 106a, 106b, 106c settings shown in FIG. 12 or in any number of intermediate settings without limitation. In addition, the controller 70 may continuously receive updated input variables 95 which may facilitate the adjustment of the level of implementation of the tactile module 12 in stimulating the occupant 180 of FIG. 2. For example, where the controller 70 assesses the input variables 95 and determines that the pilot is resting 108 or is generally non-alert, the controller 70 may activate the vibrating units 14 and/or probing units 16 at a medium or high level of intensity.

Figure 13:
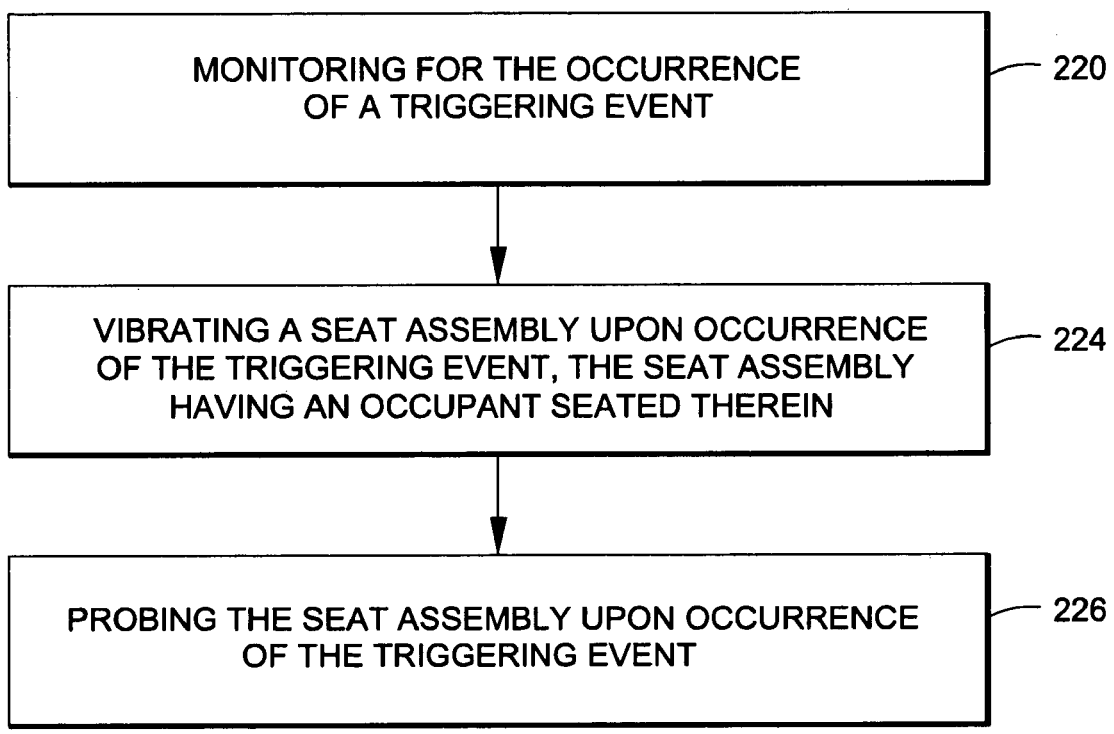
FIG. 13 is a flow diagram illustrating a methodology of alerting an occupant of a seat assembly of a triggering event.

Referring to FIG. 13 and with additional reference to FIGS. 1-12, shown in FIG. 13 is a flow diagram illustrating a methodology of alerting an occupant 180 of the seat assembly 154 as shown in FIG. 2 upon the occurrence of the triggering event. The methodology may initially comprise step 220 of monitoring for the occurrence of the triggering event which may include any number of events such as those requiring action on the part of the flight crew or requiring monitoring by the flight crew. Sensing of the triggering event may be performed by vehicle systems and may include receiving input variables 95 at the controller 70 as described above with regard to FIG. 12. A non-limiting example of a triggering event may include a missed flight interaction cue such as an unheeded or unanswered request from air traffic control for verbal communication from the flight crew. Upon monitoring for the occurrence of the triggering event, the alerting system 10 as shown in FIGS. 1 and 8 may perform step 224 of causing one or more of the vibrating units 14 of FIGS. 1-3 and 5-8 to initiate vibrating of the seat assembly 154 as shown in FIGS. 6-7. In this regard, upon occurrence of the triggering event, one or more of the vibrating units 14 of FIG. 6 may be activated by the controller 70 shown in FIGS. 1 and 8-10. For example, at least one of the vibrating units 14 of FIG. 6 may be caused to vibrate at a predetermined frequency and for a predetermined vibration event duration (VDR) as shown in FIGS. 10 and 11. Furthermore, as illustrated in FIG. 10, at least one of the vibrating units may vibrate for a predetermined number of vibration events per time unit (VPU) as described above with reference to FIG. 11. Furthermore, as shown in FIG. 10, upon occurrence of the triggering event, at least one of the vibrating units 14 may vibrate according to one or more vibration parameters 126 such as those which are listed in the state table 72 of FIG. 10. Vibration produced by the vibrating units 14 shown in FIG. 6 may provide a relatively low level of stimulation to the occupant 180 shown in FIG. 2 relative to the level of stimulation that may be provided to the occupant 180 by the probing units 16 shown in FIGS. 1-8.

Referring still to FIG. 13, step 226 may comprise activating one or more of the probing units 16 as shown in FIGS. 1-8 to initiate probing of the seat assembly 154 as shown in FIGS. 6-7. In an embodiment, at least one of the probing units may be caused to probe the seat assembly shown in FIGS. 6-7 in a manner to provide an increased level of stimulation to the occupant of the seat assembly relative to the level of stimulation that may be provided to the occupant by one or more of the vibrating units 14 shown in FIGS. 6-7. For example, at least one of the probing units 16 may be caused to probe the seat assembly according to a probing parameter as described above with reference to FIGS. 10 and 11. As indicated above, at least one of the probing units 16 may be configured such that the probing element shown in FIGS. 6-7 may reciprocate within an amount of the probe travel 134 within a predetermined range as indicated above with reference to FIGS. 10-11. In this regard, the probe travel may be such that increasing levels of stimulation are provided to the occupant shown in FIG. 2. The probing of the seat assembly shown in FIG. 6-7 may occur in sequence with vibration of the vibrating units or in conjunction with vibration of the vibrating units.

Figure 14:
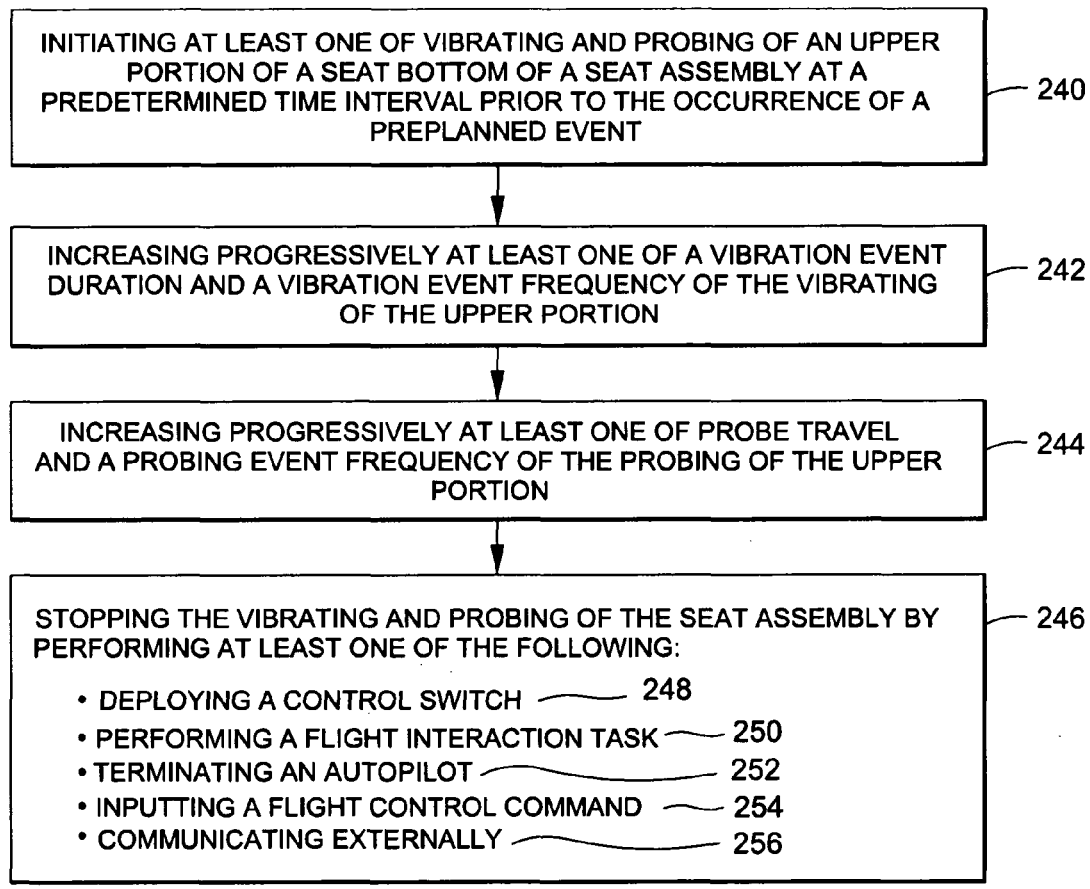
FIG. 14 is a flow diagram illustrating a methodology of alerting the occupant of the seat assembly of a preplanned event.

Referring to FIG. 14 and with additional reference to FIGS. 1-12, shown in FIG. 14 is a flow diagram illustrating a methodology of alerting an occupant 180 of a seat assembly 154 in anticipation of a preplanned event such as a flight interaction task. As indicated above, a flight interaction task may include any number of tasks that may be performed at a designated time during the course of a flight and/or during ground operations. For example, the preplanned event may include a voice report prior to the start of initial descent. The methodology may include step 240 of initiating the vibrating of the upper portion 164 of the seat bottom 162 as shown in FIGS. 6-7. Step 240 may further include probing the upper portion 164 at a predetermined time interval prior to the occurrence of the preplanned event. Step 242 may comprise progressively increasing the vibration event duration 128 and/or the vibration event frequency 130 during the vibrating of the upper portion 164. The progressive increase may be performed according to the state table 72 of FIG. 10 as described above or by any other suitable means including manual adjustment.

Step 244 may include progressively increasing the probe travel 134 and/or the probing frequency 136 during the probing of the upper portion 164 of the seat assembly 154. Indications regarding the alertness of the flight crew may be ascertained by monitoring the flight control status 98 input variable 95 shown in FIG. 12 or by monitoring the transmission of external communications 96 or by other means. Step 246 may include stopping or deactivating the vibrating and/or probing of the seat assembly 154 of FIG. 2. The stopping of the vibrating and/or probing may comprise deploying the control switch 78 in step 248. The deactivating of the vibrating and/or probing may also be performed in step 250 by performing a flight interaction task such as by reporting the start of an initial descent or by any other action indicating that the flight crew is alert.

For example, the step of stopping of the vibrating and/or probing may comprise step 252 including terminating an autopilot to deactivate the vibrating and/or probing of the seat assembly 154 of FIG. 2. In another example, step 254 may comprise inputting a flight control command such as by adjusting a power setting, manipulating a flight control or any other one of a variety of flight control commands. Step 256 may comprise communicating externally to air traffic control, to nearby aircraft traffic or to the cabin crew (i.e., flight attendants). Such communications may by way of verbal communication and/or data communication. In this regard, it should be noted that the deactivating step may comprise any action, occurrence or condition where stimulation of the occupant of FIG. 2 may no longer be required or may be temporarily suspended or otherwise altered.

Figure 15:
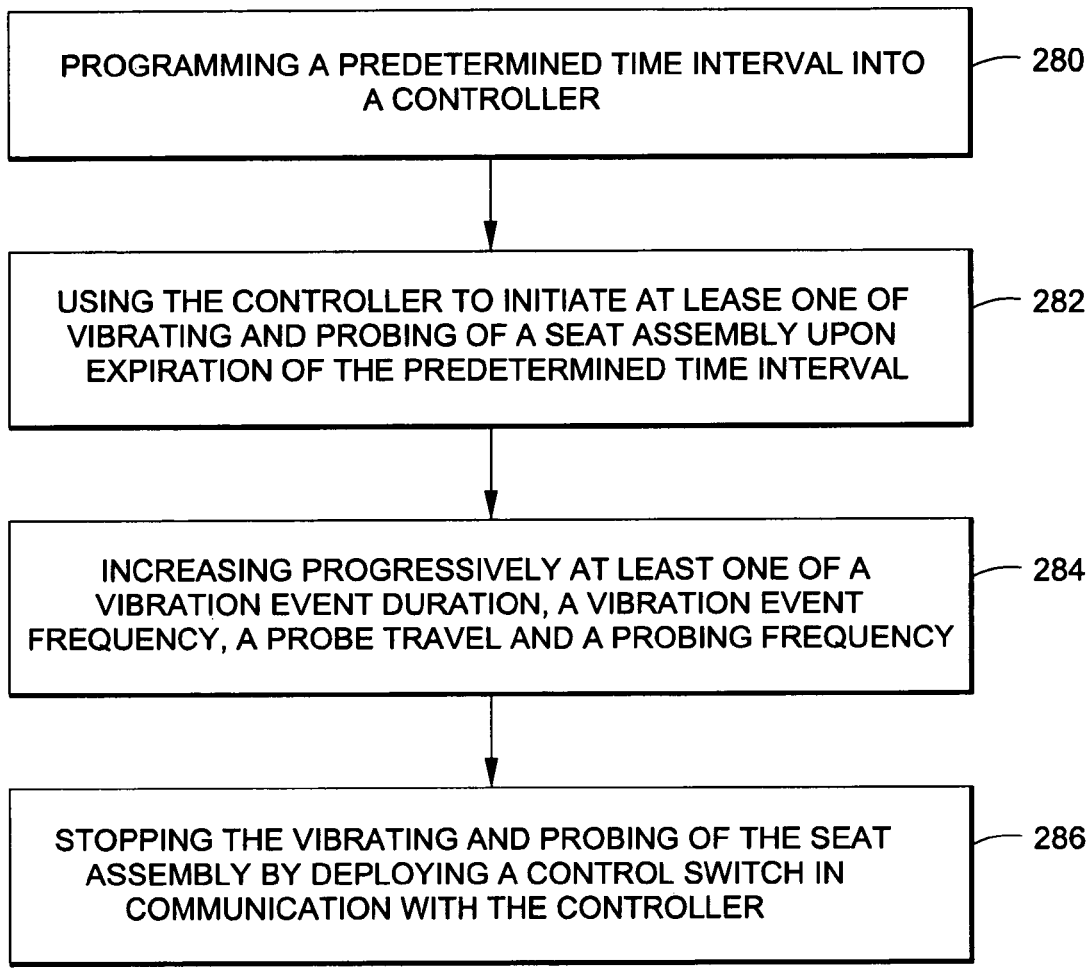
FIG. 15 is a flow diagram illustrating a methodology of managing the rest of the occupant of the seat assembly.

Referring to FIG. 15 and with additional reference to FIG. 10, shown in FIG. 15 is a flow diagram illustrating a methodology of managing rest of the occupant 180 of the seat assembly 154 shown in FIG. 2. Where permitted by airline operations, the alerting system shown in FIGS. 1-8 may facilitate controlled resting of one of the flight crew during non-critical stages of a long-distance or lengthy flight such that the flight crew may remain alert during other stages of the flight. In the methodology illustrated in FIG. 15, the expiration of the period of crew rest may comprise the triggering event shown in FIG. 10 and which may be categorized as a preplanned event. The period of rest may be of a predetermined duration which may be lengthier than the duration of the predetermined time interval. The rest period may be pre-flight programmed to occur at predetermined times during the flight. Optionally, the period of rest may be manually programmed by one or more of the flight crew during a flight.

As shown in FIG. 15, the methodology for managing rest may include step 280 of programming a predetermined time interval into the controller 70 of FIGS. 8-9. Step 282 may include using the controller 70 to initiate the vibrating of the seat assembly 154 and/or the probing of the seat assembly 154 at the start of the predetermined time interval as shown in FIG. 10. As described above, the controller as shown in FIG. 10 may be programmed with a state table 72 causing the tactile module 12 to implement an initially low intensity level of stimulation of the seat assembly 154 shown in FIG. 2 by initially activating the vibrating unit 14 according to a vibration parameter 126 and/or according to a probing parameter 132 such as those which are listed in the state table 72 of FIG. 10 although other values may be used for the vibration and probing parameters 126, 132.

Optionally, step 284 may include a progressive increase in intensity to gradually awaken or alert the occupant. For example, the controller of FIGS. 8-9 may cause the probing unit 16 to be activated in order to increase the intensity of stimulation. The vibration event frequency 130 and/or the vibration event duration 128 may be increased. The controller 70 may cause the probing element 34 to reciprocate in order to increase the stimulation. Upon expiration of the predetermined time period, the intensity may be increased further such as by increasing the probing frequency 136 and/or probe travel 134 until it is determined that the occupant is awake or alert. The methodology may include step 286 of stopping the vibrating and probing of the seat assembly 154 by deploying the control switch 78. Alternatively, step 286 may comprise deactivating the tactile module 12 by performing one or more of the actions described with reference to the methodology of FIG. 14 or any other action that provides an indication to the controller 70 that the occupant is awake and/or alert or that other flight crew are awake or alert.

Figure 16:
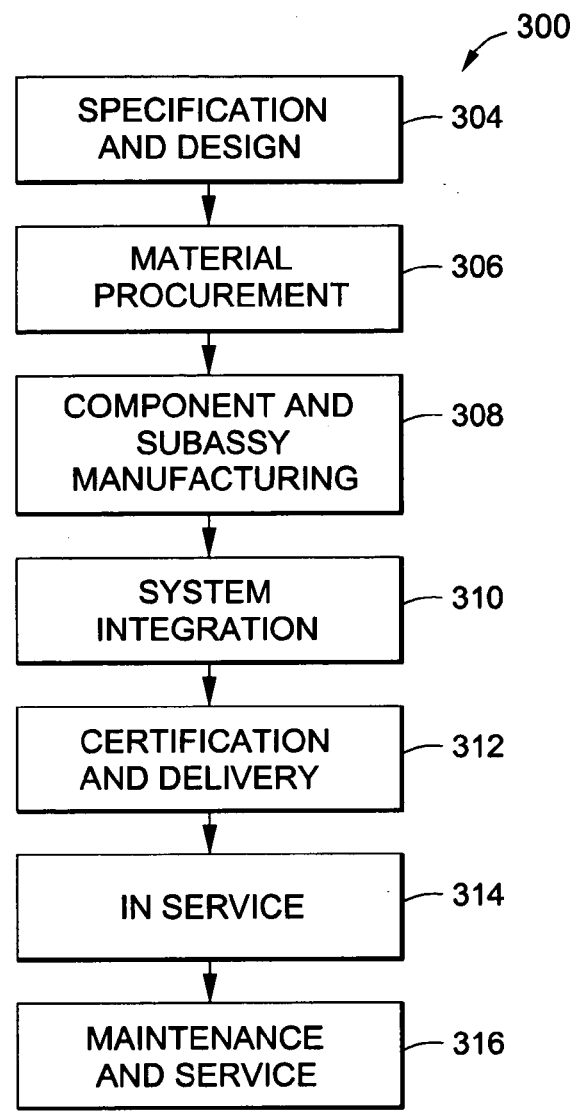
FIG. 16 is a flow diagram of an aircraft production and service methodology.
Figure 17:
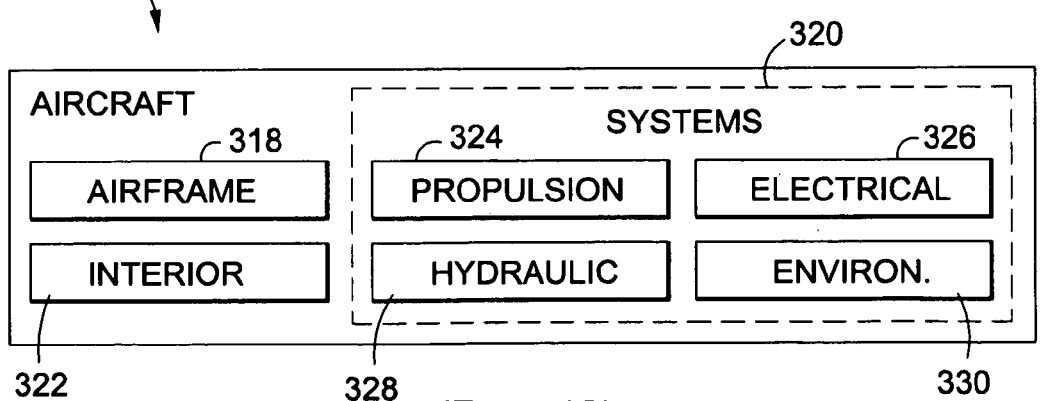
FIG. 17 is a block diagram of an aircraft.

Referring to FIGS. 16-17, embodiments of the disclosure may be described in the context of an aircraft manufacturing and service method 300 as shown in FIG. 16 and an aircraft 302 as shown in FIG. 17. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service, for example and without limitation, to maintenance and service 316.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An alerting system for a seat assembly of an aircraft, comprising:
    a tactile module mountable to the seat assembly and including:
        a probing unit having an axially movable, elongated probing element; and
    a controller communicatively coupled to the tactile module and being configured to perform at least one of activating and deactivating the probing unit in response to the respective occurrence of a triggering event and a deactivating event each comprising communication with a source remote from the aircraft;
    the controller being configured to progressively increase at least one of a probe travel and a probing frequency of the probing unit until the occurrence of a deactivating event.

2. The alerting system of claim 1 wherein:
    the triggering event comprises a preplanned event;
    the controller being configured to activate the probing unit at a predetermined time interval prior to occurrence of the preplanned event.

3. The alerting system of claim 2 wherein the preplanned event comprising at least one of the following:
    a flight interaction task; and
    a crew rest period.

4. The alerting system of claim 1 wherein the triggering event comprising at least one of the following:
    a missed flight interaction cue;
    a deviation from a flight profile;
    a flight condition; and
    receipt of a remote activation signal.

5. The alerting system of claim 1 wherein:
    the probing unit being configured to be operated according to a probing parameter.

6. The alerting system of claim 5 wherein:
    the controller is configured to cause an increase in the probing parameter.

7. The alerting system of claim 5 wherein:
the probe travel ranges from approximately 0.25 inch up to at least 2.00 inches;
the probing frequency ranging from 1 cycle per minute up to at least 60 cycles per minute.

8. The alerting system of claim 5 wherein:
the controller is programmed with a state table comprising a sequence of operating the probing unit in correspondence with a progressive increase in the probing parameters.

9. The alerting system of claim 1 wherein the tactile module comprises a pair of the probing units disposed in spaced relation to one another and being mounted within an interior of the seat assembly.

10. The alerting system of claim 9 wherein the probing units are mounted such that at least one of the probing elements is configured to probe an upper portion of a seat bottom to cause movement thereof.

11. The alerting system of claim 1 further comprising:
a membrane; and
a vibrating unit configured to vibrate the seat assembly; and
a mounting block mountable on the membrane for supporting the vibrating unit in non-contacting relation to the membrane.

12. The alerting system of claim 1 wherein:
the tactile module further includes a control switch configured for activating and deactivating the probing unit.

13. An alerting system for a seat assembly of an aircraft, the seat assembly having a seat bottom, the alerting system comprising:
a tactile module, including:
a membrane mountable within an interior of the seat bottom; and
a probing unit having an outwardly extendable and axially movable, elongated probing element configured to linearly probe the seat bottom;
a controller in communication with the tactile module and being configured to activate the probing unit in response to communication with a source remote from the aircraft, the controller being configured to cause a progressive increase in at least one of a probe travel and a probing frequency of the probing unit until the occurrence of a deactivating event.

14. A method of alerting an occupant of a seat assembly of an aircraft of the occurrence of a triggering event, the seat assembly having a seat bottom, the method comprising the steps of:
monitoring for the occurrence of the triggering event comprising communication with a source remote from the aircraft; and
linearly probing the seat bottom in response to the occurrence of the triggering event using an axially movable, elongated probing element;
progressively increasing at least one of a probe travel and a probing frequency of the probing element until the occurrence of a deactivating event.

15. The method of claim 14 wherein:
the triggering event comprises a preplanned event; and
the step of probing the seat assembly being initiated at a predetermined time interval prior to the occurrence of the preplanned event.

16. The method of claim 15 wherein the vehicle is an aircraft, the preplanned event comprising at least one of the following:
a flight interaction task; and
a crew rest period.

17. The method of claim 14 wherein the vehicle is an aircraft, the triggering event comprising at least one of the following:
a missed flight interaction cue;
a deviation from a flight profile;
a flight condition; and
receipt of a remote activation signal.

18. The method of claim 14 further comprising the step of stopping the probing of the seat assembly by performing at least one of the following:
deploying a control switch;
performing a flight interaction task;
terminating an autopilot;
inputting a flight control command; and
communicating externally.

19. The method of claim 14 wherein the step of probing the seat assembly further comprises:
increasing progressively at least one of a probe travel and a probing frequency.

20. The method of claim 19 wherein the step of increasing progressively at least one of the probe travel and the probing frequency comprising at least one of the following:
increasing the probe travel up to at least 2.00 inches; and
increasing the probing frequency from 1 cycle per minute up to at least 60 cycles per minute.

21. A method of managing rest of an occupant of a seat assembly of an aircraft, the seat assembly having a seat bottom, the method comprising the steps of:
programming a predetermined time interval into a controller;
using the controller to initiate probing of the seat assembly at the expiration of the predetermined time interval;
linearly probing the seat bottom using an axially movable, elongated probing element;
progressively increasing at least one of a probe travel and a probing frequency of the probing element until the occurrence of a deactivating event; and
stopping the probing of the seat bottom upon the occurrence of a deactivating event comprising communication with a source remote from the aircraft.

22. The method of claim 21 wherein the step of probing the seat assembly further comprises:
increasing progressively at least one of a probe travel and a probing frequency.

23. The method of claim 21 further comprising the step of:
stopping the probing of the seat assembly by deploying a control switch in communication with the controller.

24. A method of alerting an occupant of a seat assembly of an aircraft, the seat assembly including a seat bottom, the method comprising the steps of:
probing the seat bottom upon the occurrence of a triggering event comprising communication with a source remote from the aircraft;
linearly probing the seat bottom using an axially movable, elongated probing element;
increasing progressively at least one of a probe travel and a probing frequency of the probing of the seat bottom until the occurrence of a deactivating event; and
stopping the probing of the seat assembly upon the occurrence of a deactivating event.

25. The alerting system of claim 1 wherein:
the controller is configured to receive input variables regarding operation of the vehicle and adjust a level of implementation of the probing element in response to the input variables.

26. The method of claim 14 wherein the seat assembly is mounted to a vehicle, the method further comprising the steps of:
 receiving input variables regarding operation of the vehicle; and
 adjusting a level of implementation of the tactile module in response to the input variables.

27. The method of claim 24 wherein the deactivating event comprises at least one of the following:
 deploying a control switch;
 performing a flight interaction task;
 terminating an autopilot;
 inputting a flight control command; and
 communicating externally.

\* \* \* \* \*